UNITED STATES PATENT OFFICE.

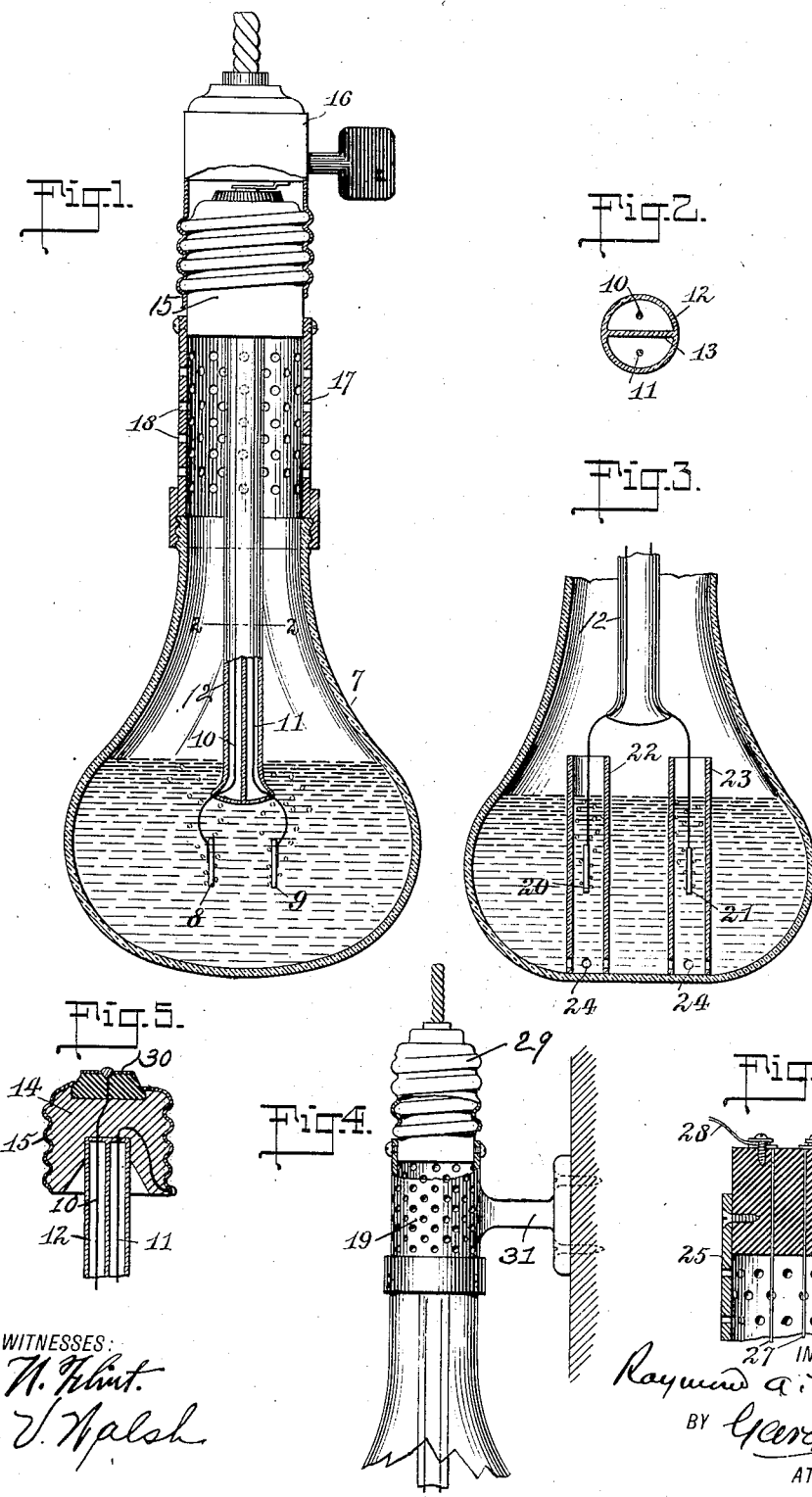

RAYMOND A. KIEFER, OF RAMSEY, NEW JERSEY.

DEVICE FOR GENERATING A STERILIZING-GAS.

1,101,078.  Specification of Letters Patent.  Patented June 23, 1914.

Application filed July 1, 1913. Serial No. 776,770.

*To all whom it may concern:*

Be it known that I, RAYMOND A. KIEFER, a citizen of the United States, and a resident of Ramsey, in the county of Bergen and State of New Jersey, have made and invented certain new and useful Improvements in Devices for Generating a Sterilizing-Gas, of which the following is a specification.

My invention relates to a device for generating a gas or vapor to be used for sterilizing, disinfecting, or deodorizing purposes, or for use as an insecticide, and the object thereof is to provide a device in which the gas will be produced from a liquid in which it is contained or has been dissolved or absorbed by means of a current of electricity passing between terminals immersed in the liquid and spaced apart from one another whereby the liquid will be disassociated and the gas set free.

A further object of my invention is to provide a device of the class above referred to which will be simple in construction, neat in appearance, and cheap to manufacture, and which may be connected with an ordinary electric light circuit, and operated by a current of electricity derived therefrom, thus dispensing with the use of a heating flame or burner such as is commonly used in the generation of a disinfecting gas, and avoiding the danger incident thereto.

With the above and other objects of invention in view, my invention consists in the improved device for generating a disinfecting, deodorizing, or similar gas illustrated in the accompanying drawing, described in the following specification and specifically claimed in the concluding claims, and in such variations and modifications thereof as will be obvious to those skilled in the art to which my invention relates.

In the drawing wherein the preferred embodiment of my invention is illustrated, Figure 1 is a view illustrating my improved gas generating device, the view being upon a vertical central plane; Fig. 2 is a view showing a section upon a transverse plane indicated by the line 2—2, Fig. 1; Fig. 3 is a view similar to Fig. 1 but illustrating slight modifications of certain of the features wherein my invention consists; Fig. 4 is a view illustrating a modified form of one of the elements of my device; Fig. 5 is a view illustrating the upper end of my device in section, and Fig. 6 is a similar view illustrating my device modified as to certain of the features thereof.

Referring to the drawings, the reference numeral 7 designates a suitable receptacle adapted to contain a liquid in which the gas to be produced has been absorbed or dissolved. This receptacle is illustrated as made of glass, although it may be made of any material, and the same is designed to be partially filled with the liquid above referred to, as illustrated in the drawing.

Within the receptacle 7 is located two electrodes 8, 9, these electrodes being spaced apart from one another so that a current of electricity in passing from one electrode to the other will pass through the liquid within the receptacle. These electrodes are connected with conducting wires 10, 11, which conducting wires preferably extend through a depending tube 12, having a central partition 13 which serves to keep the wires apart from one another and prevent short circuiting as will be understood. The upper end of the tube 12 is embedded in a mass of insulating material 14, placed within a threaded sleeve 15, with which sleeve the upper end of the conducting wire 11 is connected, while the upper end of the conducting wire 10 is connected with a second terminal 30, the terminals being thus insulated from one another.

In the form of my invention illustrated in Figs. 1, 4 and 5, the threaded member 15 corresponds in size with the standard form of threaded base of an ordinary incandescent lamp, so that my gas generating device as a whole may be screwed into an electric light socket 16 and thus receive a supply of current from the lighting mains in precisely the same manner that a current would be supplied to an incandescent lamp.

The upper end of the receptacle 7 is in communication with the atmosphere, so that gas generated from the liquid within the same may escape freely into the surrounding atmosphere and thus disinfect or deodorize the room or compartment in which the device is placed. This end is shown as accomplished by providing a connecting member 17 intermediate the terminals and the open upper end of the receptacle 7, which connecting member is provided with a plurality of holes 18 through which the gas may escape, it being understood that the form of the holes or openings is immaterial so long as the gas generated within the receptacle may escape freely through them into the surrounding atmosphere.

In the form of my device shown in Fig. 1, a cord, whereby the lamp socket 16 is supported, serves also to support the gas generating device as a whole. In the form of my invention shown in Fig. 4, however, the connecting member 19 is provided with a bracket 31 which may be secured to a wall, casing, or other support, in which case no weight is borne by the cord which leads to the socket 29.

In using my improved gas generating device, the receptacle 7 is partially filled with a liquid in which the gas or vapor to be generated is contained, whereupon, and upon completing a circuit through the terminals by turning the key in the lamp socket, a current of electricity will flow to the electrodes 8, 9, and through the liquid between them, thereby disassociating the liquid and setting the gas free, which gas passes through the openings 18 as above explained.

When my device is to be used for generating a disinfecting gas, I preferably partially fill the receptacle 7 with a solution of water in which formaldehyde gas has been absorbed or dissolved, and which solution is commonly referred to as formalin. This solution is then slightly acidulated as by the addition of a drop or thereabout of sulfuric acid to each fluid ounce of the solution. If then a current of electricity be caused to flow through the solution, the water is disassociated and separated into hydrogen and oxygen, and gaseous formaldehyde is liberated from the liquid and passes therefrom and through the openings 18 into the surrounding atmosphere. In case other gases or vapors are to be generated for use as disinfectants or insecticides, I need simply to use in place of formalin an aqueous solution in which the gas in question has been absorbed or dissolved, which solution upon being subjected to the action of a current of electricity will be disassociated and the gas contained therein will be set free as above explained. In case my device is to be used purely for deodorizing purposes, I may use water in the receptacle 7, to which any suitable perfume is added, which mixture, upon being subjected to the action of a current of electricity, will, as above explained, be disassociated and the odor of the perfume set free.

In cases where my device is used for the purpose of generating formaldehyde gas, I prefer to dilute the formalin used with approximately one-half its volume of water for the reason that I have found that if undiluted formalin is used, there is a tendency to produce a precipitate of solid formaldehyde or paraform. If, however, the solution is diluted, no such precipitation occurs.

When my device is in use the liquid adjacent the electrodes is heated to some extent by the passage of the current of electricity through it, and the entire mass of liquid within the receptacle is consequently more or less heated through convection. This action is advantageous in case a rapid generation of the gas is desired, as in cases in which it is required to disinfect a compartment or room occupied by a person having a contagious disease. In some cases, however, as, for example, in case the generation of the gas is to be prolonged throughout a considerable period, I prefer to avoid as much as possible, heating of the entire mass of liquid within the receptacle. This end may be accomplished in the manner shown in Fig. 3 of the drawing, in which the electrodes 20, 21 are shown as located within tubes 22, 23 extending upward from the bottom wall of the receptacle and open at both ends. The upper ends of these tubes extend above the level of the liquid in the receptacle, while the lower ends are provided with openings 24, so that the liquid may flow through them into the tubes. Inasmuch as the heating action would appear to be localized in the immediate vicinity of the electrodes, it therefore follows that small portions only of the fluid are heated in this form of my device, and that the walls of the tubes prevent this heated liquid from communicating its heat to the main body of liquid within the receptacle by convection.

While I have illustrated my device as provided with terminals similar to terminals such as are used with a standard form of incandescent electric lamp, it will be understood that this feature is for convenience only and that the terminals may be secured to a block of insulating material of any shape secured to and supported from the upper end of the connecting member 17. Thus, referring to Fig. 6, I have shown the connecting member 25 as having a block of insulating material 26 secured to its upper end through which block conductors 27 leading to electrodes extend, which conductors are suitably connected with wires 28 leading from any suitable source of electricity. The conductors 27 are shown as not inclosed in a glass tube, it being perfectly obvious that the tube may be dispensed with in cases where the conductors are not liable to come into contact with one another and thus produce a short circuit.

From the above it will be appreciated that I provide a gas generating device which may be attached to and supported from an ordinary incandescent electric lamp socket in the same manner that the lamp is supported, and which device may be operated from a current of electricity derived from the supply means for the lamp. It therefore follows that the danger accompanying the generation of formaldehyde gas by means of heat as by means of a flame or other form of heating device having an exposed fire is avoided, and a device is produced in which there is no danger of fire when the same is used. It will also be understood that after the device has been put in place all that is necessary in order to start the same is to turn the key of the lamp socket, whereupon the generation of the gas begins. This gives the operator abundance of time to depart from the room or compartment to be disinfected, before a sufficient amount of gas has been generated to cause inconvenience, which is a feature of importance in disinfecting a compartment or room to destroy the germs of a contagious disease, as an excessive amount of gaseous disinfecting medium is commonly used in such cases. It will be furthermore obvious that my device may be easily so arranged that the current may be turned on from an adjacent room, although it may be remarked that the generation of the gas starts slowly after the current has been turned on and does not attain its full activity until some two or three minutes have elapsed.

Having thus described and explained my invention, I claim and desire to secure by Letters Patent:

1. A device of the character described comprising a receptacle for containing a liquid communicating with the atmosphere, and having located therein two electrodes adapted to enter the liquid contained within the receptacle, and means connected with said receptacle for supporting the receptacle from an ordinary electric lamp socket.

2. A device of the character described comprising a receptacle for containing a liquid and communicating with the atmosphere, means connected with said receptacle for supporting the receptacle from an electric lamp socket, and electrodes electrically connected at one end to said means, and at their opposite ends adapted to extend into the liquid contained in said receptacle.

3. In a device of the class described, a suitable receptacle open at its upper end and adapted to contain a liquid; two electrodes located within said receptacle and spaced apart from one another and adapted to be submerged in the liquid therein; two terminals insulated from and held in fixed relation with reference to one another; conductors connecting said terminals with said electrodes; and a foraminous connecting member separate from said receptacle and located intermediate the upper end of said receptacle and said terminals.

4. In a device of the class described, a suitable receptacle open at its upper end and adapted to contain a liquid; two terminals arranged one within the other and insulated from one another; a tubular member intermediate the upper end of said receptacle and said terminals and which member is provided with a series of circumferentially arranged openings; and means for conducting a current of electricity from one of said terminals through the liquid in said receptacle and to the other of said terminals.

5. In a device of the class described, a suitable receptacle open at its upper end and adapted to contain a liquid; two electrodes located within said receptacle and spaced apart from one another and adapted to be submerged in the liquid therein; two terminals insulated from and held in fixed relation with reference to one another; conductors connecting said terminals with said electrodes; a foraminous connecting member intermediate the upper end of said receptacle and said terminals; and two tubes one surrounding each of said electrodes, said tubes being open at both ends and the upper ends of which extend above the surface of the liquid in said receptacle.

6. In a device of the class described, a suitable receptacle open at its upper end and adapted to contain a liquid; two terminals arranged one within the other and insulated from one another and the outer of which terminals is provided with a screw thread; a tubular member intermediate the upper end of said receptacle and said terminals and which member is provided with a series of openings; two electrodes located within said receptacle and spaced apart from one another; and conductors connecting each of said terminals with one of said electrodes.

7. In a device of the class described, a suitable receptacle open at its upper end and adapted to contain a liquid; two terminals arranged one within the other and insulated from one another and the outer of which terminals is provided with a screw thread; a tubular member intermediate the upper end of said receptacle and said terminals and which member is provided with a series of openings; two electrodes located within said receptacle and spaced apart from one another; and a lamp socket having a threaded portion adapted to receive said threaded terminal whereby the device may be connected with a source of electricity.

Signed at New York borough of Manhattan in the county of New York and State of New York this 27th day of June A. D. 1913.

RAYMOND A. KIEFER.

Witnesses:
R. N. FLINT,
A. V. WALSH.